(12) United States Patent
Brosche

(10) Patent No.: US 11,280,882 B2
(45) Date of Patent: Mar. 22, 2022

(54) METHOD AND RADAR DEVICE FOR ASCERTAINING RADIAL RELATIVE ACCELERATION OF AT LEAST ONE TARGET

(71) Applicant: Robert Bosch GmbH, Stuttgart (DE)

(72) Inventor: Thomas Brosche, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 190 days.

(21) Appl. No.: 16/494,424

(22) PCT Filed: Jan. 25, 2018

(86) PCT No.: PCT/EP2018/051801
§ 371 (c)(1),
(2) Date: Sep. 16, 2019

(87) PCT Pub. No.: WO2018/166684
PCT Pub. Date: Sep. 20, 2018

(65) Prior Publication Data
US 2021/0116536 A1  Apr. 22, 2021

(30) Foreign Application Priority Data

Mar. 17, 2017 (DE) ...................... 10 2017 204 496.9

(51) Int. Cl.
*G01S 7/35* (2006.01)
*G01S 13/34* (2006.01)
*G01S 13/58* (2006.01)

(52) U.S. Cl.
CPC ............. *G01S 7/354* (2013.01); *G01S 13/34* (2013.01); *G01S 13/584* (2013.01); *G01S 7/356* (2021.05)

(58) Field of Classification Search
CPC ........ G01S 7/354; G01S 13/34; G01S 13/584; G01S 7/356
(Continued)

(56) References Cited

U.S. PATENT DOCUMENTS 6,633,253 B2 * 10/2003 Cataldo ............... G01S 13/5244
  342/160
6,731,235 B2 *  5/2004 Kishida ................. G01S 13/931
  342/128
(Continued)

FOREIGN PATENT DOCUMENTS

DE       4423899 C1 * 11/1995 ............. G01S 13/58
DE  102012220879 A1 *  5/2014 ............... G01S 7/35
(Continued)

OTHER PUBLICATIONS

International Search Report for PCT/EP2018/051801, dated Apr. 30, 2018.

*Primary Examiner* — Peter M Bythrow
*Assistant Examiner* — Nuzhat Pervin
(74) *Attorney, Agent, or Firm* — Norton Rose Fulbright US LLP; Gerard Messina

(57) ABSTRACT

A method is described for ascertaining an acceleration of a target or an object with the aid of radar waves. In a first step, at least one radar transmit signal is sent by at least one transmitting device. At least one radar reception signal reflected from a target is received and subsequently conveyed to an evaluation unit. The evaluation unit converts the radar reception signals into digital measuring values and is used for further processing of the digital measuring values. In a further step, the digital measuring values are subjected to a two-dimensional Fourier transform. At least one target reflection is detected on the basis of peak values or selected from a resulting absolute value spectrum or distance-velocity spectrum. At least one distance of a target from the transmitting device and at least one radial velocity of a target in relation to the transmitting device are ascertained based on the distance-velocity spectrum. Subsequently, at least one angle of the at least one target is determined in relation to an alignment of the transmitting device. Based on the determi- (Continued)

nation or computation of the distance, the transverse velocity, and the angle, the particular signal components relevant for the estimation are separated. For at least one target reflection of an actual target or object, after carrying out an inverse Fourier transform, at least one radial acceleration is approximately computed from the remaining again transformed measured values. Furthermore, a radar device is described.

8 Claims, 3 Drawing Sheets

(58) Field of Classification Search
USPC .......................................................... 342/159
See application file for complete search history.

(56) References Cited

U.S. PATENT DOCUMENTS

| | | | | |
|---|---|---|---|---|
| 7,436,348 B2* | 10/2008 | Nohmi | ................... | G01S 13/904 342/25 R |
| 7,893,868 B2* | 2/2011 | Akita | ................... | G01S 13/931 342/192 |
| 7,928,897 B2* | 4/2011 | Ishii | ................... | G01S 13/46 342/105 |
| 7,944,392 B2* | 5/2011 | Falk | ................... | G01S 7/352 342/195 |
| 8,077,076 B2* | 12/2011 | Walter | ................... | G01S 13/345 342/70 |
| 8,314,732 B2* | 11/2012 | Oswald | ................... | G01S 7/415 342/90 |
| 8,334,800 B2* | 12/2012 | Hayase | ................... | G01S 13/931 342/70 |
| 8,643,534 B2* | 2/2014 | Margolin | ................... | G01S 5/12 342/30 |
| 8,779,965 B2* | 7/2014 | Sentelie | ................... | G01S 13/56 342/22 |
| 9,024,809 B2* | 5/2015 | Testar | ................... | G01S 13/584 342/128 |
| 9,229,102 B1* | 1/2016 | Wright | ................... | G01S 13/887 |
| 9,285,504 B2* | 3/2016 | Dannevik | ................... | G01W 1/00 |
| 9,664,778 B2* | 5/2017 | Comic | ................... | G01S 7/35 |
| 9,829,567 B1* | 11/2017 | Davis | ................... | G01S 7/282 |
| 9,945,943 B2* | 4/2018 | Stark | ................... | G01S 13/931 |
| 10,073,171 B2* | 9/2018 | Bordes | ................... | G01S 13/50 |
| 10,324,165 B2* | 6/2019 | Bordes | ................... | G01S 7/0232 |
| 10,393,872 B2* | 8/2019 | Brisimitzakis | ........... | B62J 27/00 |
| 10,416,299 B2* | 9/2019 | Schoor | ................... | G01S 13/42 |
| 10,527,718 B2* | 1/2020 | Matsumoto | ........... | G01S 13/931 |
| 10,594,916 B2* | 3/2020 | Sivan | ................... | G06F 3/012 |
| 10,620,304 B2* | 4/2020 | Halbert | ................... | G01S 13/003 |
| 2003/0122702 A1* | 7/2003 | Kishida | ................... | G01S 13/345 342/70 |
| 2008/0012753 A1* | 1/2008 | Cheng | ................... | G01S 13/536 342/174 |
| 2009/0009385 A1* | 1/2009 | Lehtinen | ................... | G01S 13/56 342/196 |
| 2010/0289692 A1* | 11/2010 | Winkler | ................... | G01S 7/4008 342/70 |
| 2018/0100918 A1* | 4/2018 | Davis | ................... | H04L 27/2278 |
| 2019/0154439 A1* | 5/2019 | Binder | ................... | G01S 15/08 |

FOREIGN PATENT DOCUMENTS

| | | | | |
|---|---|---|---|---|
| DE | 102012220879 A1 | | 5/2014 | |
| DE | 102014226030 A1 * | | 6/2016 | ........... G01S 13/343 |
| DE | 102014226030 A1 | | 6/2016 | |
| EP | 1318415 A1 * | | 6/2003 | ........... G01S 13/931 |
| JP | 2005009886 A | | 1/2005 | |
| JP | 2014132250 A | | 7/2014 | |
| JP | 2016003873 A | | 1/2016 | |
| JP | 2016075524 A | | 5/2016 | |
| JP | 2017522577 A | | 8/2017 | |
| WO | 02054369 A1 | | 7/2002 | |
| WO | WO-02054369 A1 * | | 7/2002 | ............ G08G 1/161 |
| WO | WO-2006045649 A1 * | | 5/2006 | ........... G01S 13/345 |

* cited by examiner

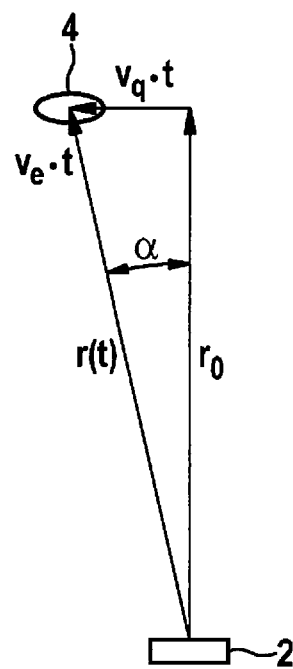 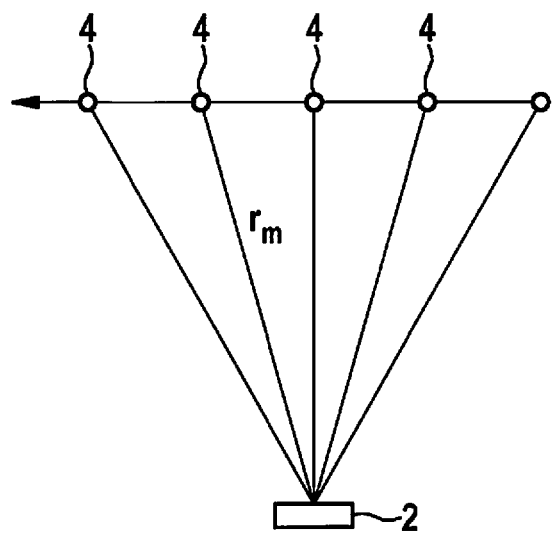
Fig. 5a  Fig. 5b
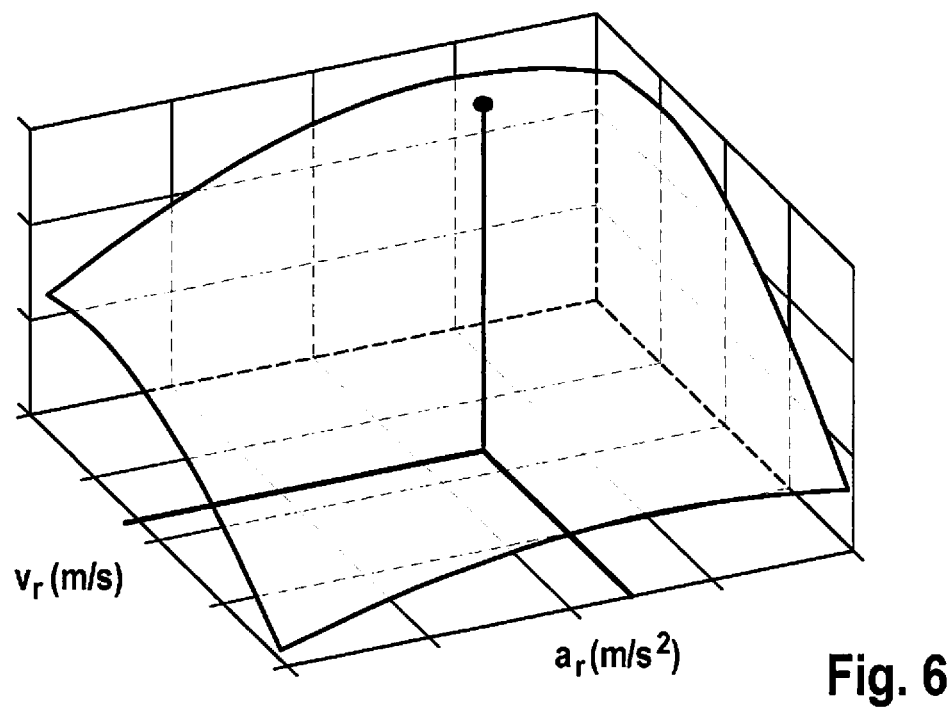
Fig. 6

METHOD AND RADAR DEVICE FOR ASCERTAINING RADIAL RELATIVE ACCELERATION OF AT LEAST ONE TARGET

FIELD OF THE INVENTION

The present invention relates to a method for ascertaining an acceleration of a target with the aid of radar waves, and a radar device for carrying out the method.

BACKGROUND INFORMATION

Radar sensors or radar devices may be used in different vehicles for locating obstacles or other vehicles. In this way it is possible, for example, to trigger a braking procedure automatically if there is a risk of collision. Furthermore, it is possible with radar assistance to assist a driver to stay in a lane or to maintain a distance to preceding vehicles, for example, by adaptive cruise control. In particular in the field of motor vehicles, radar devices may also be used to detect objects in a blind spot and, for example, warn a driver before a collision.

In a radar device, modulated transmit signals are sent by at least one transmitting device. The transmit signals are reflected by objects located in the transmission range. The reflected signals and/or received signals are recorded by a receiving device and subsequently evaluated. A relative velocity of objects may also be determined in addition to the distance of objects by the modulation of the transmit signals, for example, by FMCW (frequency modulated continuous wave) radar devices. In this case, frequency differences or delays result between the transmit signals and the received signals, which are analyzed. A corresponding method for determining a relative velocity is described, for example, in DE 10 2012 220 879 A1.

SUMMARY

An object underlying the present invention may be considered that of creating a radar device and a method which enable the determination of a distance between a radar device and a target, and a determination of a relative velocity of the target and additionally an ascertainment of an acceleration of the target with the aid of radar waves.

According to one aspect of the present invention, a method for ascertaining an acceleration of a target or an object with the aid of radar waves is provided. In a first step, at least one radar transmit signal is sent by at least one transmitting device. At least one radar reception signal reflected from a target is received and subsequently transmitted to an evaluation unit. The evaluation unit converts the radar reception signals into digital measured values and is used for further processing of the digital measured values. In a further step, the digital measured values are subjected to a two-dimensional Fourier transform. At least one target reflection is detected or selected from a resulting absolute value spectrum or distance-velocity spectrum on the basis of peak values. At least one distance of an object from the transmitting device and at least one radial velocity of a target in relation to the transmitting device are ascertained based on the distance-velocity spectrum. Subsequently, at least one angle of the at least one target is determined in relation to an alignment of the transmitting device and at least one transverse velocity. Based on the determination or computation of the distance, the radial velocity, and the angle, all remaining target reflections are excluded, except for the target reflection for which the acceleration is presently to be estimated. For at least one target reflection of an actual target or object, after carrying out an inverse Fourier transform, at least one radial acceleration is approximately computed from the remaining re-transformed measured values.

The determination of the radial acceleration for at least one target may thus take place with additional consideration of the transverse velocity or the transverse component of a velocity of at least one target in relation to a radar device. The ascertained radial acceleration of the target may thus be provided to subsequent tracking, clustering, target classification, and the like as an additional piece of information. The influence of incorrect associations of reflection positions from measurement to measurement in the tracking on the acceleration estimation may be avoided. The additional information of the relative radial acceleration may optimize, for example, automatic emergency braking functions. It is relevant in this case, for example, whether a target accelerates away from a vehicle having a radar device or decelerates. The situation may be evaluated as more critical due to braking of the preceding vehicle than in the case of simultaneous acceleration in the same direction. By way of additional measurement or estimation of the angle of the target in relation to the transmitting device, ghost targets may be at least partially precluded during the evaluation of the digital measuring data. The measurements required for this purpose may also be carried out in the form of separate measuring sequences or by additional measuring devices. The detection and/or the selection of at least one peak value of a target reflection in the distance-velocity spectrum preferably takes place as a function of an application of the method. If the method is used for a braking assistance system, for example, in particular the preceding targets are thus relevant. In contrast, if the method is used in an adaptive cruise control, laterally positioned objects or vehicles are also relevant. The selection of the peak values is not restricted in this case to the mentioned examples highlighted for illustration.

According to one exemplary embodiment, the at least one reflected radar reception signal may be received by the at least one transmitting device and/or by an additional receiving device. In this way, a transmitting device may both send radar waves in the form of radar transmit signals and also receive reflected radar waves in the form of radar reception signals. A transmitting device may be designed more compactly in this way.

According to another exemplary embodiment, the at least one target reflection is separated from further target reflections by masking or by windowing.

In this case, the peak values or peaks and values which are not associated with the particular target reflection for which the acceleration is presently estimated may be set to 0 in the distance-velocity spectrum. In this way, interfering reflections or ghost targets which are not unambiguous or are erroneous may also be filtered out. The further processing of the digital measured values is thus restricted to digital measured values of actual targets.

According to another exemplary embodiment, the at least one target reflection is reconstructed by estimating the position and complex-valued amplitude of at least one peak value. In this way, a peak value may be approximated, for example, with the aid of an interpolation method and the signal associated with the peak value may be simulated, for example, by a function. The further processing of the digital measured values may thus be simplified and carried out on the basis of the simulated function.

According to another exemplary embodiment, the at least one distance of at least one real target is determined by the transmitting device by a propagation time measurement of the at least one radar transmit signal. For this purpose, the method may include, for example, interposed measuring sequences which are only used for distance measurement. In this way, the distance to a target may be ascertained in a simplified manner. This may be carried out both by using the radar device and by using additional distance meters.

According to another exemplary embodiment, the at least one velocity of at least one target in relation to the transmitting device is determined by computation from at least two reflected radar reception signals. For this purpose, an additional measuring sequence may be used to ascertain a relative velocity in the radial and transverse directions on the basis of multiple chronological distance measurements. Alternatively, an additional radar device, video measuring device, or laser measuring device may additionally be used for this purpose.

According to another aspect of the present invention, a radar device is provided having at least one transmitting device for sending at least one radar transmit signal and at least one receiving device for receiving at least one reflected radar reception signal having an evaluation unit for converting the radar reception signals into digital measured values and for processing the digital measured values. For this purpose, based on a determination or computation by the evaluation unit, a distance of the transmitting device from a target, a radial velocity of a target in relation to the transmitting device, and an angle between an alignment of the transmitting device and the target, all target reflections, except for the target reflection for which the acceleration is presently estimated, are excluded. Furthermore, the evaluation unit, based on the processed data for target reflections of real targets after carrying out an inverse Fourier transform, may approximately compute radial accelerations from the transformed measured values. In this way, the radar device may be used in particular for improved assistance functions in the field of motor vehicles. Such a radar device may also be implemented as a LIDAR (light detecting and ranging) device or on the basis of ultrasound.

According to one exemplary embodiment, the digital measured values may be further processed in a hardware-based and/or software-based manner by the evaluation unit. The evaluation unit may be designed in this case, depending on the application, in the form of software, for example, within a digital signal processor or microcontroller, and/or in the form of hardware. An evaluation unit may be designed as hardware-based, for example, as an integrated circuit, or as a field programmable gate array.

Preferred exemplary embodiments of the present invention are explained in greater detail hereafter on the basis of greatly simplified schematic views.

BRIEF DESCRIPTION OF THE DRAWINGS

FIGS. 5a-b show an overview of several relevant vectors and variables.

FIG. 6 shows a schematic diagram for estimating a radial acceleration as a step of the method according to the first exemplary embodiment.

DETAILED DESCRIPTION

Figure 1:
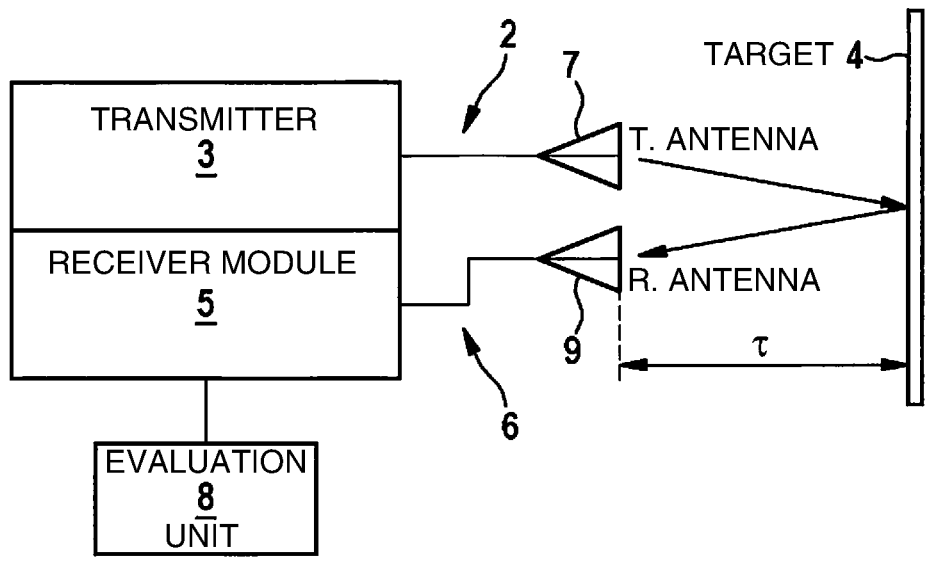
FIG. 1 shows a schematic illustration of a radar device according to a first exemplary embodiment.

In the figures, the same constructive elements each have the same reference numerals.

FIG. 1 shows a radar device 1 according to a first exemplary embodiment. A number of radar waves are emitted as ramped frequency-modulated radar transmit signals via a transmitting device 2. Transmitting device 2 includes a transmitter 3 and a transmitting antenna 7. Transmitter 3 activates transmitting antenna 7. According to the exemplary embodiment, a fast chirp modulation is used. During a measuring interval $T_{meas}$ (not shown), M short frequency-modulated ramped radar transmit signals are sent. The radar transmit signals have a time interval $T_{rr}$ in relation to one another in this case and have a particular duration of $T_{mod}$. Time interval $T_{rr}$ of the ramps in relation to one another is in the same order of magnitude as the duration of a ramp or a ramped frequency-modulated radar transmit signal. This time interval $T_{rr}$ may be somewhat greater or also less than the ramp duration. The ramps may also not be situated equidistantly with respect to time. The radar waves or the radar transmit signals are reflected at a target 4. For example, targets 4 present in a detection field of radar device 1 may be motor vehicles, persons, posts, guardrails, transitions between different materials, and the like. After a reflection procedure, radar reception signals are formed from the radar transmit signals. The radar reception signals may subsequently be received by a receiving device 6. Radar receiving device 6 includes a receiver module 5 and a receiving antenna 9 in this case. Receiver module 5 processes the reflected radar waves or signals received by receiving antenna 9. The radar reception signals reach receiving device 6 only after a delay time τ. The signals which are measured by receiving device 6 and subsequently preprocessed (for example, demodulated, amplified, filtered) are conveyed to an evaluation unit 8, where the radar reception signals may be further processed. The arrows illustrate the course of the radar waves from transmitting device 2 via a reflection at target 4 to receiving device 6.

Figure 2:
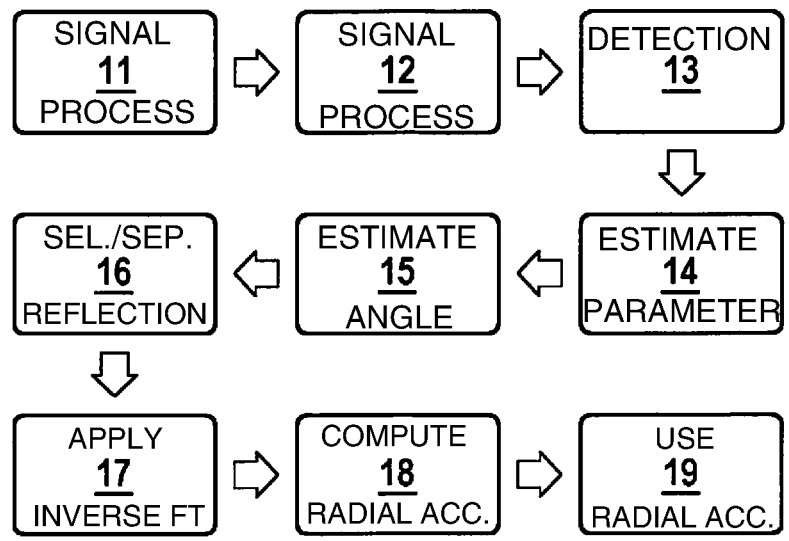
FIG. 2 shows a sequence of a method according to a first exemplary embodiment.
Figure 4:
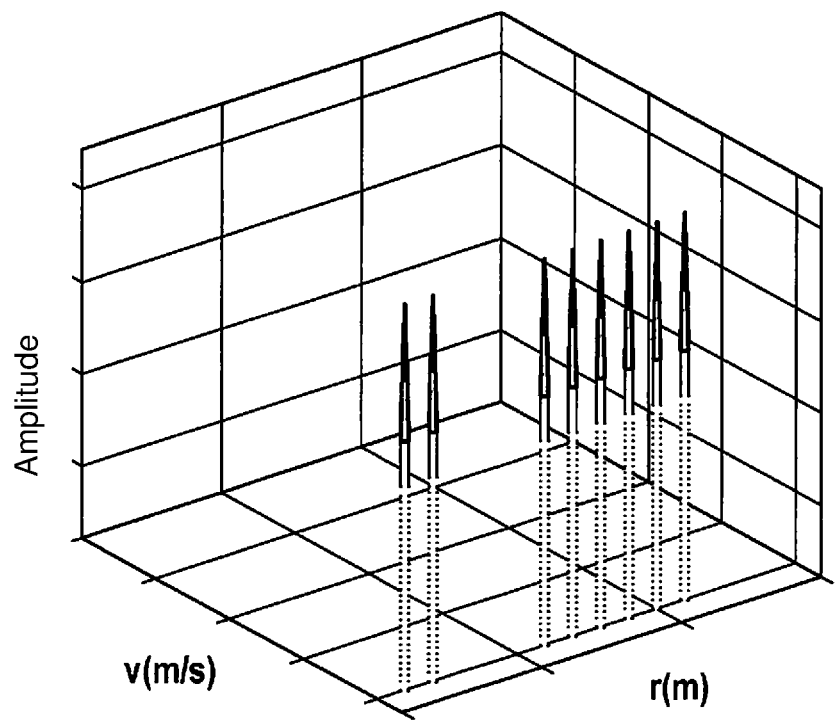
FIG. 4 shows a schematic distance-velocity spectrum of the method according to the first exemplary embodiment, which corresponds to detail A in FIG. 3.

A simplified sequence of a method 10 according to a first exemplary embodiment is shown in FIG. 2. After the reception of the radar reception signals, the radar reception signals are conveyed to evaluation unit 8. In addition to transmitting device 2 and receiving device 6, method 10 is carried out in large part by evaluation unit 8. In evaluation unit 8, the received reflected radar reception signals are converted 11 into digital measured values. The measured values are transformed in next step 12 by a two-dimensional discrete Fourier transform into a distance-velocity spectrum. For this purpose, inter alia, the Fourier transform is carried out along corresponding values of the individual ramps in the Doppler and/or velocity direction. A distance-velocity spectrum is shown by way of example in FIG. 4. In a further step 13, the peak values in the distance-velocity spectrum are detected. The peak values correspond in this case to actual or real targets 4 or represent ghost targets or interference, which may not be associated with a real target or object. A physical target 4 may also include multiple individual target reflections or peak values. Subsequently, in a further step 14, at least one distance r of receiver 6 and transmitting device 2 and at least one relative radial velocity in relation to at least one target 4 are ascertained. In this case, transverse velocities $v_g$ of target 4 in relation to receiver 6 and transmitting device 2 are also ascertained. Subsequently, at least one angle α of a target 4 in relation to an alignment of receiver 6 and transmitting device 2 is determined 15. If radar device 1 includes an antenna having multiple transmitting 2 and/or receiving channels 6, an angle estimation may be carried out in the azimuth or elevation direction of target reflections 4 and thus a determination of the 3D target positions in space may be carried out. For this purpose, first signal processing steps 11, 12 are carried out separately before detection 13 for each combination of transmitting and receiving channel. On the basis of the summarized spectra of the individual channels, detection 13, parameter estimation 14, and angle estimation 15 are subsequently carried out. Targets may be excluded based on the estimation of distance 14, radial velocity 14, and angle 15 and the target reflections of actual targets 4 may be selected or separated 16 for the acceleration estimation. In next step 17, the separated measuring signal for the particular selected target reflection value or peak value is subjected to an inverse Fourier transform and subsequently radial acceleration $a_r$ is approximately computed 18 from the transformed measured values. The described separation and computation of the acceleration may be repeated in the same manner for further target reflections. In a last step 19, the approximately computed values for radial accelerations $a_r$ of the selected target reflections may be used, for example, for subsequent tracking, clustering, target classification, and the like. Alternatively, the ascertained data may be conveyed to a processor unit, so that these data may be incorporated into corresponding assistance functions.

Figure 3:
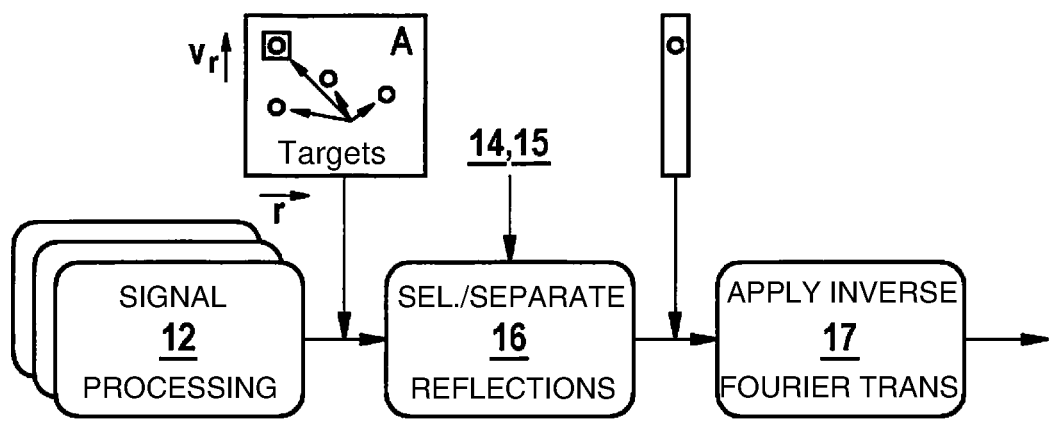
FIG. 3 shows a sequence for selecting peak values of targets.

A sequence for selecting peak values of actual or relevant targets according to step 16 is illustrated in FIG. 3. For this purpose, steps 12, 16, and 17 shown in FIG. 2 are highlighted. After two-dimensional discrete Fourier transforms in multiple receiving channels 12, a distance-velocity spectrum for each receiving channel results from the digital measured values, which is shown enlarged in FIG. 4. In the next step, at least one target reflection is selected and separated 16 with the aid of estimated or determined values for a distance r and/or a radial velocity $v_r$ and/or angle α. Signal vector X or, after inverse DFT (value from ramp to ramp) in the Doppler direction, signal vector x=IDFT(X) is obtained. Subsequent steps 17 through 19 are carried out based on this selected target reflection.

A possible approximate computation of a radial acceleration $a_r$ is described in greater detail hereafter. A phase difference $\varphi_{a,m}$ varying over time t between the radar transmit signals and the radar reception signals at the point in time of the particular mth ramp as a function of radial acceleration $a_r$ may be simulated by a following simplified model:

$$\varphi_{a,m} \approx -\frac{2\pi \cdot f_c \cdot T_{rr}^2}{c} \cdot a_r \cdot \left(m - \frac{M-1}{2}\right)^2$$

having a mean ramp frequency $f_c$, a ramp number m, a total number of ramps M within measuring interval $T_{meas}$, and speed of light c. During measuring interval $T_{meas}$, M short frequency-modulated ramped radar transmit signals are sent. The radar transmit signals have a time interval $T_{rr}$ in relation to one another in this case.

The simultaneous estimation of $a_r$ and $v_q$ on the basis of a receiving channel results in ambiguities. Transverse velocity component $v_q$ therefore has to be previously known or estimated in another manner, for example, by tracking methods. The vectorial relations are illustrated for this purpose in FIGS. 5a and 5b. A target 4 has a distance r(t) at point in time t or $r_m$ during the mth ramped radar transmit signal from transmitting device 2 in this case. Shortest distance $r_0$ between target 4 and transmitting device 2 is when angle α=0°. Angle α may be considered as an azimuth angle or elevation angle or as a linear combination of both angles.

$$r_m(v_q) = r(v_q) = \sqrt{r_0^2 + \left(v_q \cdot \left(m - \frac{M-1}{2}\right) \cdot T_{rr}\right)^2}$$

The mean value with respect to time for a distance change $\overline{\Delta R}$ may be determined on the basis of the following mathematical formula.

$$\Delta \bar{r} = r_0 \cdot \left(\frac{\sqrt{1 + \left(\frac{v_q T_{mess}}{2r_0}\right)^2}}{2} + \frac{1}{2\frac{v_q T_{mess}}{2r_0}} \cdot \ln\left(\frac{v_q T_{mess}}{2r_0} + \sqrt{1 + \left(\frac{v_q T_{mess}}{2r_0}\right)^2}\right)\right) - 1$$

However, this only applies in the case of transverse velocities of $v_q \neq 0$ m/s. At a transverse velocity of $v_q=0$ m/s, $\Delta \bar{r}=0$ m results.

Theoretical phase positions $\varphi_{a,m}$ of the radar reception signals at the points in time of particular ramp m as a function of radial acceleration $a_r$ and measuring signal vector x=IFFT(X), which is separated for the present reflection and inversely Fourier transformed in the Doppler direction (values of ramp to ramp), are used for the estimation of the radial acceleration to compute the square of the absolute value $|Y(a_r)|^2$, which is then maximized $$\hat{a}_r = \underset{a_r, v_r}{\mathrm{argmax}}\{|Y(a_r)|^2\} - \frac{-2v_q^2}{\sqrt{(2r_0)^2 + (v_q T_{mess})^2}}$$

with $Y(a_r)$ as the result of the standardized Fourier transform at equidistant ramp intervals $T_{rr}$.

$$Y(a_r) = \frac{FFT\{x \cdot \exp[-j\varphi_a(a_r)]\}}{\sum_m |x|}$$

The square of the absolute value $|Y(a_r)|^2$ is shown for illustration purposes in FIG. 6. The position of the maximum of the square of the absolute value $|Y(a_r)|^2$ corresponds in this case to the estimated values of radial acceleration $\hat{a}_r$ and radial velocity $\hat{v}_r$ of a target 4.

In the case of ramp intervals which are not equidistant, the FFT is replaced by a Bartlett estimator or the non-equidistant points in time of the ramps are used.

To increase the accuracy, transverse velocity $v_q$ may additionally also be taken into consideration. $Y(a_r)$ is then $$Y(a_r) = \frac{FFT\{x \cdot \exp[-j\varphi_a(a_r)] \cdot \exp[-j\Delta\varphi_{v_q}]\}}{\sum_m |x|}$$

with the vector formed from phase positions $\varphi_{a,m}$ $$\varphi_a = \{\varphi_{a,m}\}$$

and the vector $$\Delta\varphi_{v_q} = 2[r_m(v_q) - \Delta\bar{r} - r_0] \cdot k$$

and also $$v_q = \sqrt{v_{q,a}^2 + v_{q,e}^2}$$

For this purpose, $r_m$ is the target distance at times step m=0, 1, 2 ... M−1; k is the wave number; $\bar{r}$ is the mean target distance; $v_{q,a}$, is the transverse velocity in the azimuth direction and $v_{q,e}$ is the transverse velocity in the elevation direction.

Radial acceleration $a_r$ may be approximately computed or estimated on the basis of the mathematical relationships shown.

What is claimed is:

1. A method for ascertaining an acceleration of a target with radar waves, the method comprising:
   sending at least one ramped frequency-modulated radar transmit signal by at least one transmitting device and receiving at least one radar reception signal reflected from at least one target;
   conveying the radar reception signal to an evaluation unit and converting the at least one received radar reception signal into digital measured values;
   carrying out a two-dimensional Fourier transform from an absolute value spectrum of the digital measured values;
   detecting at least one target reflection of the target based on peak values in an absolute value spectrum;
   determining at least one distance of the target from the transmitting device and at least one relative velocity that includes a radial velocity of the target in relation to the transmitting device and at least one transverse velocity of the target in relation to the transmitting device; and
   determining at least one angle of target in relation to an alignment of the transmitting device, wherein based on the determining of the distance, the relative velocity, and the angle, all remaining reflections of the target are excluded, except for the target reflection of the target for which the acceleration is to be estimated, so that all the remaining reflections of the target and/or interferences are suppressed, and after carrying out an inverse Fourier transform, radial accelerations are approximately computed from the transformed measured values.

2. The method as recited in claim 1, wherein at least one of the reflected radar reception signal is sent by the at least one transmitting device and the reflected radar reception signal is received by an additional receiving device.

3. The method as recited in claim 1, wherein the target reflection for which the acceleration is estimated in each case, is separated by masking of peak values from all further target reflections and interfering signals.

4. The method as recited in claim 1, wherein the target reflection for which the acceleration is estimated in each case is approximated by reconstruction or determination of at least one peak value.

5. The method as recited in claim 1, wherein the distance of the target is ascertained from the transmitting device by a propagation time measurement and the radial velocity of the radar transmit signal.

6. The method as recited in claim 1, wherein the transverse velocity is determined by computation from at least two reflected radar reception signals.

7. A radar device, comprising:
   at least one transmitting device;
   at least one receiving device; and
   an evaluation unit, the radar device carrying out a method for ascertaining an acceleration of a target with radar waves, by performing the following:
     sending at least one ramped frequency-modulated radar transmit signal by the transmitting device and receiving by way of the receiving device at least one radar reception signal reflected from at least one target; and
     conveying the radar reception signal to the evaluation unit for conversion of the at least one received radar reception signal into digital measured values, wherein the evaluation unit:
       carries out a two-dimensional Fourier transform from an absolute value spectrum of the digital measured values,
       detects at least one target reflection of the target on the basis of peak values in an absolute value spectrum,
       determines at least one distance of the target from the transmitting device and at least one relative velocity that includes a radial velocity of the target in relation to the transmitting device and at least one transverse velocity of the target in relation to the transmitting device, and
       determines at least one angle of target in relation to an alignment of the transmitting device, wherein based on the determining of the distance, the relative velocity, and the angle, all remaining reflections of the target are excluded, except for the target reflection of the target for which the acceleration is to be estimated, so that all the remaining reflections of the target and/or interferences are suppressed, and after carrying out an inverse Fourier transform, radial accelerations are approximately computed from the transformed measured values.

8. The radar device as recited in claim 7, wherein the digital measured values are further processed by the evaluation unit in at least one of a hardware-based manner and a software-based manner.

* * * * *